Sept. 2, 1958  R. A. MANHART ET AL  2,850,108
RECORDING OF SEISMIC DATA AND RECORDER OPERATING CONDITIONS
Filed Dec. 28, 1954
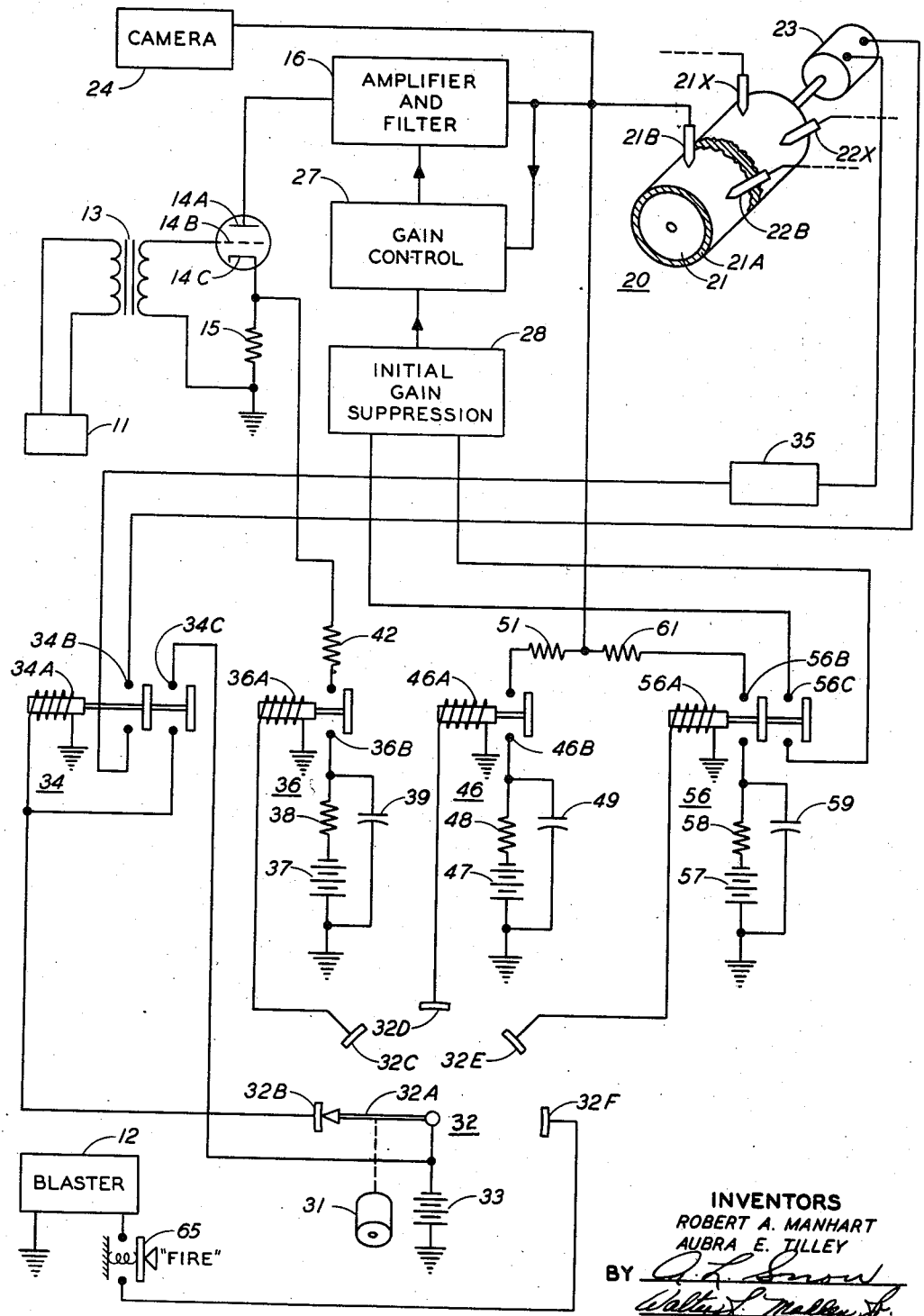
INVENTORS
ROBERT A. MANHART
AUBRA E. TILLEY
BY
ATTORNEYS

United States Patent Office 2,850,108
Patented Sept. 2, 1958

2,850,108

RECORDING OF SEISMIC DATA AND RECORDER OPERATING CONDITIONS

Robert A. Manhart and Aubra E. Tilley, Fullerton, Calif., assignors to California Research Corporation, San Francisco, Calif., a corporation of Delaware Application December 28, 1954, Serial No. 478,146

6 Claims. (Cl. 181—.5)

This application relates in general to seismic prospecting and relates more particularly to methods of and apparatus for recording data obtained in such prospecting.

In seismic prospecting, artificial seismic disturbances are created in the earth, and energy from these disturbances which is refracted through and reflected from various subsurface strata in the earth is converted by seismic wave detectors into electrical signals varying in sympathy with movement of the earth. The seismic wave detector signals are amplified and usually preliminarily filtered prior to recording on a suitable recording medium. Preferably, a reproducible recording medium is used so that the detector signals may be subsequently withdrawn repeatedly and at will for further analysis, such as with additional filtering or mixing of different signals.

One of the most suitable of such reproducible recording media is a magnetizable element, such as a rotor having a layer of magnetizable material about the periphery thereof or a loop of magnetizable material, on which the different detector signals are recorded as variations in the magnetization of the medium. The recorder is provided with recording and reproducing means for each channel, such as a recording/reproducing head which is preferably movable along the time axis of the recording medium. The signals are usually recorded side by side on the magnetizable medium to produce a plurality of adjacent traces along the length or time axis of the recording medium.

In addition to the information contained in the seismic detector signals themselves, there are a number of other variables involved in the seismic recording operation which is necessary to record in some manner. Among such variables are the settings of the different filters in the different amplifying or recording channels. Usually, such filter networks are adjustable over a fairly wide range, and it is essential that the filters in the different channels be set identically or that some indication be made as to any differences in setting. Heretofore, the information as to the filter settings is written in the observer's log book and is later transcribed to the seismic record.

Another variable involved in seismic recording is the instant of removal from the amplifying system of the so-called initial suppression. In most seismic recording systems, prior to creation of the seismic disturbances, the gain of the amplifier is reduced to a minimum to suppress any signals generated by the detectors prior to firing of the shot. Such initial suppression customarily functions by supplying a signal to the gain-controlling means of the amplifier to reduce the initial or pre-shot gain to the desired minimum value. The initial suppression is usually removed shortly before the firing of the shot so that the first breaks or arrivals from the detectors are clearly recorded, and it is desirable that an accurate indication in the instant of the removal of the initial gain suppression be available.

In reproducible recording, an additional variable of importance is the position of each of the different movable recording/reproducing heads relative to the recording medium. As mentioned above, such heads are usually movable relative to each other along the time axis of the recording medium, and it is important that the relative position of each of the heads be known when examining the record. This is particularly important when the different recorded signals are to be reproduced and mixed, since differences in the recording head positions are reflected as time differences in the recorded signals.

Broadly, the present invention contemplates methods and apparatus for recording seismic data in which indications are provided on the recording medium of the conditions of a number of variables involved in the recording operation. More particularly, the present invention contemplates methods of and apparatus for providing on a reproducible recording medium indications of the condition of a number of variables involved in seismic recording in addition to the seismic detector signals.

Preferably, a master programmer is used in conjunction with the recording equipment to initiate operation of the recording medium and sequentially control a number of operations for providing the desired data. The master programmer may include a stepping switch which sequentially energizes the recording equipment and a series of networks which generate pulses to be supplied to the recorder. The data which indicate the conditions of the variables of interest are preferably recorded on the portion of the recording medium prior to the seismic detector signal so that there is no interference with the detector signals. In addition to controlling the operation of the recording medium and to instituting the operational checks on the recording equipment, the master programmer may be utilized to initiate the creation of the seismic disturbance which produces the detector signals to be recorded.

It is, therefore, an object of this invention to provide improved methods of and apparatus for recording seismic data.

It is an additional object of the present invention to provide methods of and apparatus for recording seismic data in which information as to the condition of each of a number of variables in the recording operation is provided on the recording medium in addition to the seismic detector signals.

It is a further object of this invention to provide methods of and apparatus for recording seismic data utilizing a master programming device which sequentially initiates operation of the recording medium, institutes a number of operational tests on the recording equipment and then initiates creation of a seismic disturbance to produce seismic detector signals which are recorded on the recording medium.

Objects and advantages other than those described above will be apparent from the following detailed description taken in conjunction with the accompanying drawing, the single figure of which diagrammatically illustrates one embodiment of the present invention.

Referring to the drawing by character of reference, one channel of a seismic recording system is shown, including a seismic wave detector 11 which generates an electrical signal varying in sympathy with movement of the earth in response to a seismic disturbance. The seismic disturbance is created by activation of a source of energy such as through a blaster 12 which fires a charge of explosives. The output from detector 11 is supplied through a transformer 13 to the input circuit of an amplifier including a vacuum tube having an anode 14A, a grid 14B and a cathode 14C. A resistor 15 is connected between cathode 14C and ground, and the secondary winding of transformer 13 is connected between grid 13C and ground. Anode 14A is connected to a network 16 for providing additional amplification and/or filtering of the detector signal from tube 14.

The output from network 16 is supplied to recording means of a reproducible recording device, such as a rotor 20 driven by a motor 23 and having a layer of magnetizable material 21A about its periphery to form the recording medium. The recorder includes a recording head 21B and may also include a corresponding reproducing head 22B for reproducing the information recorded on medium 21A by the recording head. The output from amplifier network 16 may also be supplied to one input channel of a recording device, such as an oscillographic camera 24, for providing a permanent record of the seismic detector signal. Although, to simplify the drawing, only one channel has been shown and described, it will be understood that in practice a considerable number of such channels are normally utilized and that the present invention is particularly adapted for use with multiple channel recording systems where the number of variables involved in the recording operation is quite large.

Amplifier 16 may also be provided with means for controlling the gain of the network to maintain the amplitude of the detector signal within predetermined limits. Such gain control means may be of the preset gain control type in which the gain of the amplifier is controlled as a predetermined function of time to maintain the amplitude of the amplified signal within predetermined limits. Alternatively, the gain control means may, as shown in Fig. 1, be of the automatic type in which a measure of the output from amplifier 16 is supplied to a gain control network 27 which feeds back a signal to amplifier 16 to adjust the amplifier gain in accordance with the amplitude of its output signal to maintain the output substantially constant. An initial suppression network 28 connected to gain control network 27 may be provided to reduce the gain of amplifier 16 to a minimum value prior to creation of the seismic disturbance to suppress any signal from the detector during this time.

A master programmer is provided to control or program the recording operation, including starting the recording medium, the institution and recording of a number of operational checks and, if desired, the initiation of the creation of the seismic disturbance. The programmer is shown diagrammatically as comprising a motor 31 driving the contact arm 32A of a programming switch 32. Programming switch 32 is provided with a plurality of contact segments 32B, 32C, 32D, 32E, and 32F, over which one end of contact arm 32A is progressively driven by motor 31. The other end of contact arm 32A is connected to a battery or other suitable source 33 which provides a source of power for the elements successively energized by switch 32.

Segment 32B of switch 32 is connected to the energizing coil 34A of a relay 34 having bridging members for bridging pairs of contacts 34B and 34C. Bridging of contacts 34B connects drive motor 23 of recorder 21 to a source of voltage 35. Contacts 34C seal-in coil 34A across battery 33 so that coil 34A remains energized after arm 32A leaves segment 32B. Segment 32C of switch 32 is connected to the energizing coil 36A of a relay having a pair of contacts 36B. Contacts 36B connect a pulse-generating network, comprising a battery 37, a resistor 38 and a capacitor 39, through a resistor 42 to the junction between cathode 14C and resistor 15. Capacitor 39 is charged from battery 37 through resistor 38, and upon closure of contacts 36B, the discharge of capacitor 39 inserts a pulse into the seismic detector signal amplifying network which is transmitted through tube 14 and amplifying and filtering network 16 to recording head 21B and to camera 24. Alternatively, capacitor 39 could be omitted and battery 37 would then supply a substantially square pulse to the amplifying and filtering network. Such a square pulse may be preferable to the capacitor pulse when checking filter settings.

Segment 32D of switch 32 is connected to the energizing coil 46A of a relay 46 having a pair of contacts 46B connected to a pulse generating network comprising a battery 47, a resistor 48 and a capacitor 49. Capacitor 49 is charged from battery 47 through resistor 48 and, upon closure of contacts 46B, the pulse generated by the discharge of capacitor 49 is supplied through a resistor 51 to recording head 21B and to the associated channel of camera 24.

Segment 32E of switch 32 is connected to the coil 56A of a relay 56 having two pairs of contacts 56B and 56C. Contacts 56B connect a generating network comprising a battery 57, a resistor 58 and a capacitor 59 to recording head 21B and the associated channel of camera 24. Contacts 56C are connected in the input circuit of gain suppression network 28 so that closure of these contacts initiates the removal of the initial suppression from amplifier 16. Segment 32F of switch 32 is connected to blaster 12 through a push-button firing contact 65 to energize blaster 12 when manually operated firing button 65 is depressed.

In operation of the system, motor 31 is started to start the operation of the programming switch 32. Switch arm 32A is rotated in a clockwise direction by motor 31, and hence arm 32A first contacts segment 32B to energize coil 34A from battery 33. Energization of coil 34A causes closure of contacts 34B to connect motor 23 to source 35 to thus start the rotation of recording medium 21A. Closure of contacts 34C seals-in coil 34A so that this coil remains energized when contact arm 32A leaves segment 32B. Arm 32A next contacts segment 32C to energize coil 36A from battery 33 to cause closure of contacts 36 B. Closure of contacts 36B causes capacitor 39 to discharge and supply a transient pulse to cathode 14C of tube 14. This pulse is transmitted through tube 14 to network 16, where the pulse is modified in shape in accordance with the particular filter settings obtaining in network 16 at this time. The modified pulse from network 16 is recorded on medium 21A by recording head 21B and on the associated channel of camera 24.

Since the identical pulse is supplied to each of the different channels, any non-uniformity among the modified pulses as recorded on medium 21A will indicate that the transient responses of the different channels are not identical, usually indicative that the filter settings of the filter networks associated with the different channels are not uniform. Hence, such non-uniformity may be easily detected by examining the transient responses of the different channels and the cause of the non-uniformity remedied or taken into account in analyzing the recorded data.

Switch arm 32 next contacts segment 32D to energize coil 46A of relay 46. Upon energization of coil 46A, contacts 46B are closed to supply a pulse from capacitor 49 through resistor 51 to recording head 21B and to the associated channel of camera 24. Since similar pulses are supplied to the different recording heads of the recorder, any variations in the positions of the recording heads relative to each other about the periphery of medium 21A may be detected by comparing the relative positions of the pulses on the different channels of the recorder. The pulse in capacitor 49 has a steeply rising front portion so that accurate comparison of the pulses on the different channels is facilitated. If variations in the different pulses appear, indicative of variations in the relative positions of the recording heads, the recording heads may be moved to correct the variations or the variations taken into account when analyzing the record.

Switch arm 32A next contacts segment 32E to energize coil 56A of relay 56. Energization of coil 56A closes contacts 56C to control gain suppression network 28 to remove the initial gain suppression from amplifier 16. Simultaneous with removal of the initial gain suppression, contacts 56B are closed to supply a pulse from capacitor 59 through resistor 61 to recording head 21B and the associated channel of camera 24, indicative of the time of removal of the initial gain suppression. This pulse is preferably supplied to only one of the recording channels since the initial suppression is simultaneously removed from all channels and only one indication of the instant of its removal is required on the recorder.

Switch arm 32A next contacts segment 32F to energize blaster 12 if switch 65 is closed. Switch 65 is operable by the shooter and is provided as a blaster interlock to prevent premature or unintentional energization of blaster 12. Upon energization of blaster 12, the charge of explosives is detonated to create the desired seismic disturbance, and the resultant energy arriving at detector 11 is converted into an electrical signal and recorded on recording medium 24A. As is well known in the art, an indication of the moment of initiation of the seismic disturbance may be provided from a suitable time break network.

Thus, it will be seen that the recording operation in accordance with the present invention comprises, in the illustrated embodiment, initiation of the operation of the recording medium, the institution of a number of operational checks on the recording equipment prior to creation of the seismic disturbance and the initiation of the seismic disturbance.

Although but one embodiment of the present invention has been illustrated and described, it will be apparent to those skilled in the art that various changes and modifications may be made therein without departing from the spirit of the invention or the scope of the appended claims.

We claim:

1. The method of conducting seismic exploration in which a plurality of seismic detector signals is supplied through a corresponding plurality of amplifying networks and filtering networks to a reproducible recording device having a plurality of recording heads movable relative to the recording medium comprising the steps of reducing the gain of said amplifying networks, supplying a first pulse through each of said amplifying and filtering networks to said recording heads to produce on said medium an indication of the transient responses of each of said amplifying and filtering networks, simultaneously supplying a second pulse to each of said recording means to produce on said recording medium an indication of the relative positions of each of said recording heads, restoring the gain of said amplifying networks, supplying a third pulse to at least one of said recording heads indicating the time of restoration of said gain, creating a seismic disturbance, producing on said recording medium an indication of the time of occurrence of said disturbance, and recording the outputs of said seismic detectors on said medium.

2. The method of conducting seismic exploration in which a plurality of seismic detector signals is supplied through a corresponding plurality of amplifying networks and filtering networks to a reproducible recording device having a plurality of recording heads movable relative to the recording medium comprising the steps of reducing the gains of said amplifying networks, supplying a first pulse through each of said amplifying and filtering networks to said recording heads to produce on said medium an indication of the transient responses of said amplifying and filtering networks, restoring the gain of said amplifying networks, supplying a second pulse to at least one of said recording heads indicating the time of restoration of said gain, creating a seismic disturbance, producing on said recording medium an indication of the time of occurrence of said disturbance, and recording the outputs of said seismic detectors on said medium.

3. The method of conducting seismic exploration in which a plurality of seismic detector signals is supplied through a corresponding plurality of amplifying networks and filtering networks to a reproducible recording device having a plurality of recording heads movable relative to the recording medium comprising the steps of reducing the gains of said amplifying networks, simultaneously supplying a first pulse to each of said recording heads to produce on said recording medium an indication of the relative positions of said recording heads, restoring the gains of said amplifying networks, supplying a second pulse to at least one of said recording heads indicating the time of restoration of said gain, creating a seismic disturbance, producing on said recording medium an indication of the time of occurrence of said disturbance, and recording the outputs of said seismic detectors on said medium.

4. Apparatus for recording seismic data in seismic exploration in which a plurality of seismic wave detectors is utilized to produce a plurality of seismic traces in response to a seismic disturbance comprising a reproducible recording device having a recording medium and a plurality of recording means, an amplifying and filtering network connecting each of said seismic detectors to an associated one of said recording means, gain control means for controlling the gains of said amplifying networks, initial suppression means connected to said amplifying networks for reducing the gains of said networks until a predeterminable time prior to receipt of energy from said disturbance by said detectors, a first pulse-generating network connected to the input of each of said amplifying and filtering networks, a second pulse-generating network connected to said initial suppression means and to one of said heads, control means for controlling the creation of said seismic disturbance, and a programming device for sequentially energizing said first and said second pulse-generating networks and said control means to sequentially (1) supply a first pulse through each of said amplifying and filtering networks to produce an indication on said recording medium of the transient response of each of said networks, (2) supply a second pulse to said initial suppression means and to one of said heads to render said initial suppression means inoperative and to produce an indication on said recording medium of the time of removal of the initial suppression, and (3) create said seismic disturbance.

5. Apparatus for recording seismic data in seismic exploration in which a plurality of seismic wave detectors is utilized to produce a plurality of seismic traces in response to a seismic disturbance comprising a reproducible recording device having a recording medium and a plurality of recording heads movable relative to said recording medium, an amplifying and filtering network connecting each of said seismic detectors to an associated one of said recording heads, gain control means for controlling the gains of said amplifying networks, initial suppression means connected to said amplifying networks for reducing the gains of said amplifying networks until a predeterminable time prior to receipt of energy from said disturbance by said detectors, a first pulse-generating network connected to the input of each of said amplifying and filtering networks, a second pulse-generating network connected to each of said recording heads, a third pulse-generating network connected to said initial suppression means and to one of said recording heads, control means for controlling the creation of said seismic disturbance, and a programming device for sequentially energizing said first, said second and said third pulse-generating networks and said control means to sequentially (1) supply a first pulse through each of said amplifying and filtering networks to produce an indication on said recording medium of the transient response of each of said networks, (2) supply a second pulse to each of said recording heads to produce an indication on said recording medium of the relative positions of each of said heads, (3) supply a third pulse to said initial suppression means and to said one of said heads to render said initial suppression means inoperative and to produce an indication on said recording medium of the time of removal of the initial suppression, and (4) create said seismic disturbance.

6. Apparatus for recording seismic data in seismic exploration in which a plurality of seismic wave detectors is utilized to produce a plurality of seismic traces in response to a seismic disturbance comprising a reproducible recording device having a recording medium and a plurality of recording heads movable relative to said recording medium, an amplifying and filtering network connecting each of said seismic detectors to an associated one of said recording heads, gain control means for controlling the gains of said amplifying networks, initial suppression means connected to said amplifying networks for reducing the gains of said networks until a predeterminable time prior to receipt of energy from said disturbance by said detectors, a first pulse-generating network connected to the input of each of said amplifying and filtering networks, a second pulse-generating network connected to each of said recording heads, a third pulse-generating network connected to said initial suppression means and to one of said heads, a programming device for sequentially energizing said first, said second and said third pulse-generating networks to sequentially (1) supply a first pulse through each of said amplifying and filtering networks to produce an indication on said recording medium of the transient response of each of said networks, (2) supply a second pulse to each of said recording heads to produce an indication on said recording medium of the relative positions of each of said heads, and (3) supply a third pulse to said initial suppression means and to said one of said recording heads to render said initial suppression means inoperative and to produce an indication on said recording medium of the time of removal of the initial suppression.

References Cited in the file of this patent

UNITED STATES PATENTS

| | | |
|---|---|---|
| 2,088,588 | Dudley | Aug. 3, 1937 |
| 2,395,481 | Hoover | Feb. 26, 1946 |
| 2,427,421 | Rieber | Sept. 16, 1947 |
| 2,604,955 | Hawkins | July 29, 1952 |
| 2,717,368 | Swan | Sept. 6, 1955 |
| 2,792,067 | Peterson | May 14, 1957 |